Figure 1:
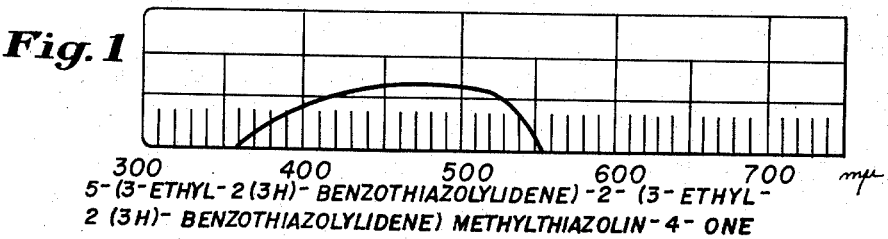

5-(3-ETHYL-2(3H)-BENZOTHIAZOLYLIDENE)-2-(3-ETHYL-
2(3H)-BENZOTHIAZOLYLIDENE) METHYLTHIAZOLIN-4-ONE

7 [(3-METHYL-2(3H)-BENZOTHIAZOLYLIDENE) METHYL]-3-[(3-
METHYL-2(3H)-THIAZOLINYLIDENE) ETHYLIDENE] IMIDAZO[1,2-a]-
PYRIDIN-2(3H)-ONE HYDROIODIDE

3-[(3-ETHYL-2(3H)-BENZOXAZOLYLIDENE) ETHYLIDENE]-7-
[(3-ETHYL-2(3H)-BENZOXAZOLYLIDENE) PROPENYL] IMIDAZO[1,2-a]-
PYRIDIN-2(3H)-ONE HYDROIODIDE

Leslie G.S. Brooker
Donald W. Heseltine
INVENTORS

United States Patent Office 2,927,026
Patented Mar. 1, 1960

---

2,927,026

MEROCYANINES AND PLANAR UNDISSOCIATED CYANINES

Donald W. Heseltine and Leslie G. S. Brooker, Rochester, N.Y., assignors to Eastman Kodak Company, Rochester, N.Y., a corporation of New Jersey Application August 30, 1956, Serial No. 607,236

12 Claims. (Cl. 96—105)

This invention relates to new merocyanine dyes, planar undissociated cyanine dyes, intermediates for preparing these new dyes, and photographic silver halide emulsions sensitized with these new dyes.

Accordingly, it is an object of our invention to provide new merocyanine dyes and planar undissociated cyanine dyes. Another object is to provide methods for making these new dyes. Still another object is to provide new intermediates for making these new dyes and methods for making these new intermediates. Another object is to provide photographic silver halide emulsions sensitized with the new dyes of our invention. Other objects will become apparent from a consideration of the following description and examples.

The new merocyanine dyes of our invention include those dyes represented by the following general formula:

I.

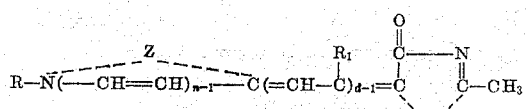

wherein R represents an alkyl group, such as methyl, ethyl, n-propyl, isopropyl, n-butyl, isobutyl, n-amyl, carboxymethyl, β-carboxyethyl, carbomethoxymethyl, carbethoxymethyl, β-methoxyethyl, allyl (vinylmethyl), benzyl (phenylmethyl), etc. (e.g., an alkyl group of the formula $C_nH_{2n+1}$ wherein $n$ represents a positive integer of from 1 to 4), $R_1$ represents a hydrogen atom, an alkyl group, such as methyl, ethyl, propyl, etc. (a lower alkyl group, for example), or an aryl group, such as phenyl, tolyl, chlorophenyl, etc. (e.g., a mononuclear aromatic group of the benzene series containing from 6 to 7 carbon atoms), $n$ represents a positive integer of from 1 to 2, $d$ represents a positive integer of from 1 to 3 (when $d$ is 3, $R_1$ is always a hydrogen atom), Q represents an oxygen atom, a divalent sulfur atom or —NR'— wherein R' is an alkyl group, such as methyl, ethyl, propyl, etc., (a lower alkyl group, for example) or an aryl group, such as phenyl, tolyl, etc., or alternatively, Q represents the mon-metallic atoms necessary to complete a heterocyclic nucleus containing 6 atoms in the heterocyclic ring (especially where 4 of said atoms are carbon atoms and the remaining atoms are sulfur or nitrogen atoms), and Z represents the nonmetallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole (i.e., [2,1]-naphthothiazole), β-naphthothiazole (i.e., [1,2]-naphthothiazole), 5-methoxy-β-naphthothiazole, 5-ethoxy-β - naphthothiazole, 7-methoxy - α naphthothiazole, 8-methoxy - α - naphthothiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5 - chlorobenzoselenazole, 5 - methoxybenzoselenazole, 5 - hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 3,3-dialkylindolenine series (e.g., 3,3-dimethylindolenine, 3,3,5 - trimethylindolenine, 3,3,7-trimethylindolenine, etc.), those of the 2-pyridine series (e.g., pyridine, 3 - methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

According to our invention, we provide the new dyes represented by Formula I above wherein $d$ represents 1, by reacting together a cyclammonium quaternary salt selected from those represented by the following general formula:

II.

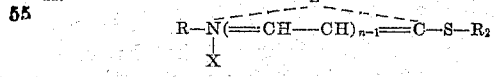

wherein R, $n$ and Z each have the values given above, $R_2$ represents an alkyl group (e.g., methyl, ethyl, etc.), or an aryl group (e.g., phenyl, o- m-, and p-tolyl, etc.), and X represents an acid anion, such as chloride, bromide, iodide, thiocyanate, sulfamate, methylsulfate, ethylsulfate, perchlorate, benzenesulfonate, p-toluenesulfonate, etc., with a compound selected from those represented by the following general formula:

III.

wherein Q has the values given above.

The new dyes represented by Formula I above wherein $d$ represents 2 or 3 ($R_1$ represents a hydrogen atom) can be prepared by condensing a cyclammonium quaternary salt selected from those represented by the following general formula:

IV. 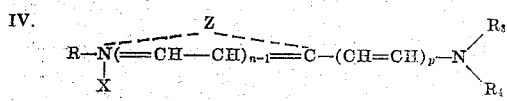

wherein R, $n$, X and Z each have the values given above, $R_3$ represents an acyl group (e.g., acetyl, propionyl, benzoyl, etc.), $R_4$ represents an aryl group (e.g., phenyl, o-, m- and p-tolyl, etc.), and $p$ represents a positive integer of from 1 to 2, with a compound selected from those represented by Formula III above.

The new dyes of our invention represented by Formula I above wherein $d$ represents 2 and $R_1$ represents an alkyl or an aryl group can advantageously be prepared by condensing together a compound selected from those represented by the following general formula:

V. 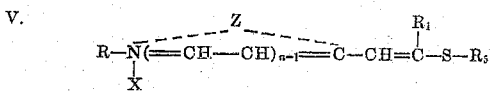

wherein R, X, $n$, Z and $R_1$ each have the values given above, and $R_5$ has the same values assigned above to $R_2$, with a compound selected from those represented by Formula III above. The intermediates of Formulas II and IV are well known in the art, while the intermediates of Formula V can be prepared according to the general method described in U.S. Patent 2,315,498, issued April 6, 1943.

The condensations of the compounds of Formula III with those of Formulas II, IV, or V can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of the compounds of Formula III with those of Formulas II, IV, or V can advantageously be carried out in the presence of a basic condensing agent, such as the trialkylamines (e.g., triethylamine, tri-n-propylamine, triisopropylamine, tri-n-butylamine, triisobutylamine, tri-n-amylamine, etc.), N-alkylpiperidines (e.g., N-methylpiperidine, N-ethylpiperidine, etc.), N,N-dialkylanilines (e.g., N,N-dimethylaniline, diethylaniline, etc.), etc.

We have found that the methyl group shown in the compounds of Formula I is reactive and that the compounds of Formula I can be further reacted with a second molecule of the intermediates of Formulas II, IV or V. Such condensations provide a new class of dyes represented by the following general formula:

VI. 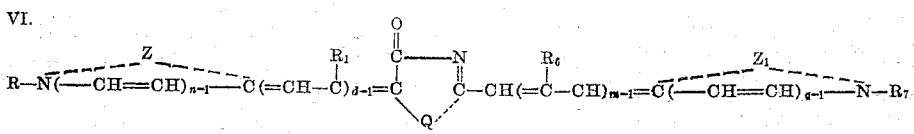

wherein R, $R_1$, $n$, $d$, Z and Q each have the values given above, $m$ represents the same values assigned to $d$ above, $q$ represents the same values assigned to $n$ above, $R_6$ represents the same values assigned to $R_1$ above, $R_7$ represents the same values assigned to R above and $Z_1$ represents the same values assigned to Z above. It is to be understood that the values for $m$, $q$, $R_6$, $R_7$, and $Z_1$ is based on the use of intermediates corresponding to those of Formula II, IV and V above, except for the substitutions indicated. Different values have been assigned, since it is immediately apparent that the same intermediate need not be used in the second condensation wherein the compound of Formula I above is condensed with one of the intermediates of Formulas II, IV or V. That is, the dyes of Formula VI can be symmetrical or unsymmetrical. Since the dyes of Formula VI contain two basic nuclei linked through an acidic nucleus and the dyes are deeply colored, they can be classified as undissociated cyanines, for it is felt that the deep color is the result of a mode of resonance wherein the dye molecule can be represented as follows:

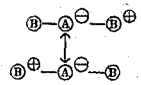

wherein Ⓑ stands for a basic nucleus and Ⓐ for an acidic nucleus. The essence of such a resonance scheme is that a positive charge is shared, as in a conventional cyanine dye between the two basic rings, while a negative charge is shared by the acidic nucleus. The general term undissociated cyanine includes the earlier reported holopolar cyanine dyes, but whereas these latter dyes are typically non-planar, the present dyes are essentially planar.

A new group of merocyanine dyes embraced by the present invention are those represented by the following general formula:

VII. 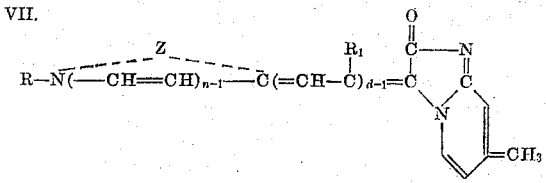

wherein R, $R_1$, $n$, $d$, and Z each have the values given above. The dyes represented by Formula VII are somewhat related to those represented by Formula I in that the methyl group of the former compounds is also reactive, providing dyes somewhat similar to those represented by Formula VI above. The dyes of Formula VII are similar in structure to those of Formula I, although a different acidic nucleus is present in each case. These dyes may be described as bearing a vinylogous relationship to one another.

In a manner similar to that for preparing the compounds represented by Formula I above, the compounds represented by Formula VII above can be prepared by condensing a compound of Formula II, IV or V with the compound represented by the following formula:

VIII. 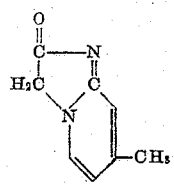

The condensations can be accelerated by heating, the use of an inert diluent, and basic condensing agents of the type mentioned above. The methyl group of the compounds represented by Formula VII can be condensed with a second molecule of the compounds represented by Formulas II, IV or V to provide undissociated planar cyanines represented by the following general formula:

IX.
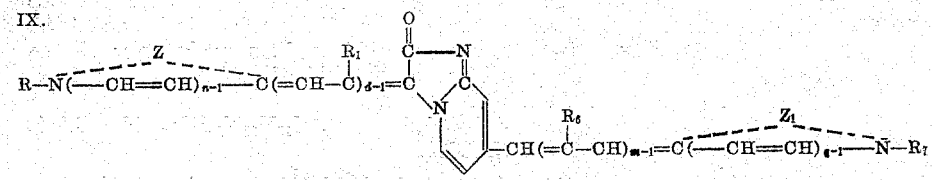

wherein R, $R_1$, $R_6$, $R_7$, $n$, $d$, $m$, $q$, Z and $Z_1$ each have the values given above. These condensations can also be accelerated by heating, and by the use of inert diluents and basic condensing agents of the type mentioned above. Similarly, the condensation of the merocyanine dyes represented by Formula I with the intermediates represented by Formulas II, IV and V can be accelerated by heating, and by use of the inert diluents and basic condensing agents of the type mentioned above.

Another group of dyes embraced by the present invention are those represented by the following general formula:

X.
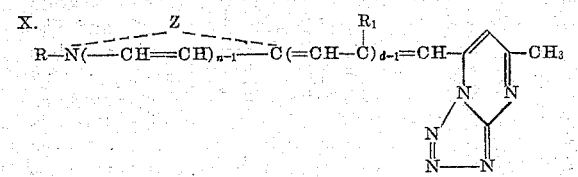

wherein R, $R_1$, $n$, $d$, and Z each have the values given above. The methyl group in the above compounds is also reactive, and can be condensed with the intermediates represented by Formulas II, IV and V to provide dyes represented by the following general formula:

XI.
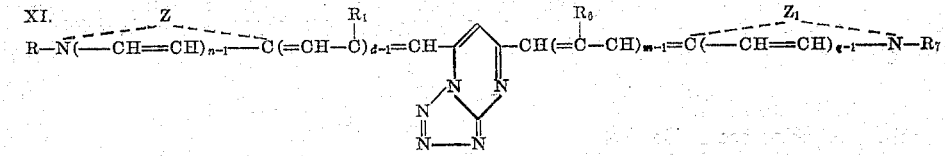

wherein R, $R_1$, $R_6$, $R_7$, $n$, $d$, $m$, $q$, Z and $Z_1$ each have the values given above.

The new dyes represented by Formula X above can advantageously be prepared by condensing an intermediate selected from those represented by Formulas II, IV and V above with the compound represented by the following formula:

X$a$.
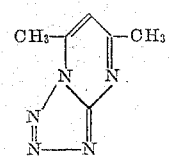

The condensations of the compounds represented by Formula X with those of Formulas II, IV or V, and the condensation of the compounds of Formulas II, IV or V with the compound of Formula X$a$, can be accelerated by heating and by use of the inert diluents and basic condensing agents mentioned above. The new dyes represented by Formula IX and by Formula XI are similar to those represented by Formula VI above in that these dyes also have two basic nuclei linked together through an acidic central nucleus.

The compounds selected from those represented by Formula VI above can also be prepared by condensing a compound selected from those represented by the following general formula:

XII.
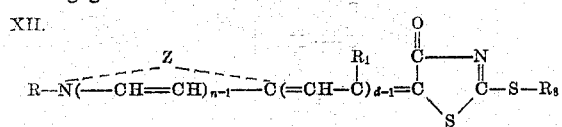

wherein R, $R_1$, $n$, $d$, and Z each have the values given above, and $R_8$ represents a lower alkyl group, such as methyl, ethyl, etc., with a cyclammonium quaternary salt containing a reactive methyl group, such as those represented by the following general formula:

XII$a$.
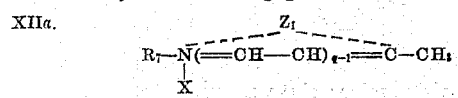

wherein $R_7$, X, $q$ and $Z_1$ each have the values given above. The intermediates selected from those represented by Formula XII above can be prepared as described in U.S. Patent No. 2,177,402. The merocyanine dyes represented by Formula XII above can also be reacted with the new merocyanine dyes represented by Formula I above after the dyes represented by Formula XII above have been quaternated with an alkyl salt, such as methyl-p-toluenesulfonate. This condensation between the dyes represented by Formula XII and those represented by Formula I provides tetranuclear dyes, such as the following:

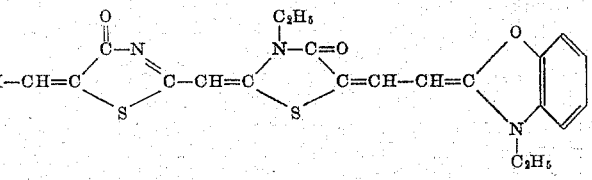

The dyes represented by Formulas I, VII and X can be quaternated by heating with an alkyl salt to provide quaternated dyes which can also be reacted with certain intermediates, such as those represented by Formulas II, III, IV and V above.

Intermediates which are useful in providing the dyes represented by Formulas I or VII include the following:

(1)
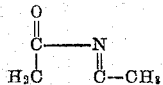

(2)
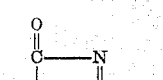

(3) 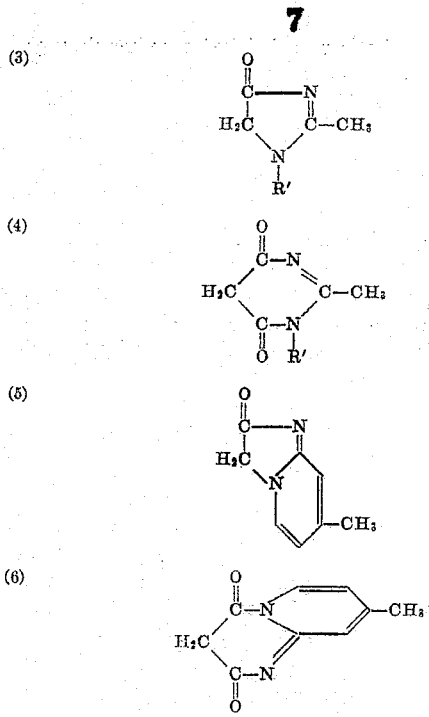

(4)

(5)

(6)

wherein R' has the values given above.

The following examples will serve to illustrate more fully the manner of practicing our invention.

*Example 1.—5-(3-ethyl-2(3H)-benzothiazolylidene)-2-methylthiazolin-4-one*

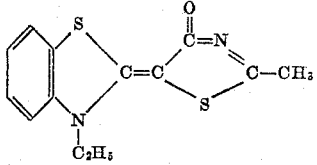

Thioacetamide (7.5 g., 10 mols.) and chloroacetamide (9.4 g., 10 mols.) were dissolved in ethyl alcohol (25 ml.), heated to the refluxing temperature and then allowed to stand at room temperature for one hour. After removal of the precipitated ammonium chloride by filtration, 3-ethyl-2-ethylmercaptobenzothiazolium ethylsulfate (3.35 g., 1 mol.) and triethylamine (1.4 ml., 1 mol.) were added, the reaction mixture was heated until the reactants had gone into solution and it was then allowed to stand at room temperature overnight. The crude dye was precipitated by the addition with stirring of water (200 ml.). The aqueous solution was then decanted and the residue stirred with methyl alcohol until crystalline. After chilling overnight, the crude dye was filtered off, washed with a little methyl alcohol and dried. The yield of purified dye after two recrystallizations from benzene was 20%, M.P. 224–5° C. dec.

*Example 2.—5-(3-ethyl-2(3H)-benzoxazolylidene)ethylidene-2-methylthiazolin-4-one*

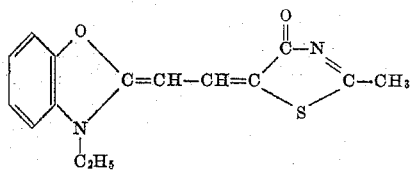

Thioacetamide (7.5 g., 10 mols.) and chloroacetamide (9.4 g., 10 mols.) were dissolved in ethyl alcohol (25 ml.) and heated to the reflux temperature. After the mixture had slowly cooled to room temperature, the ammonium chloride was filtered off and discarded. 2-β-acetanilidovinyl-3-ethylbenzoxazolium iodide (4.34 g., 1 mol.) and triethylamine (2.8 ml., 2 mols.) were then added to the filtrate and the mixture warmed until all of the reactants were in solution. After standing at room temperature for two hours, the crude dye was filtered off, washed with a little methyl alcohol and dried. After two recrystallizations from methyl alcohol and one from benzene, the yield of purified dye was 10%, M.P. 230–31° C. dec.

*Analysis.*—Calcd. for $C_{15}H_{15}N_2O_2S$: N, 9.8%. Found: N, 9.9%.

*Example 3.—5-(3-ethyl-2(3H)-benzothiazolylidene)-ethylidene-2-methylthiazolin-4-one*

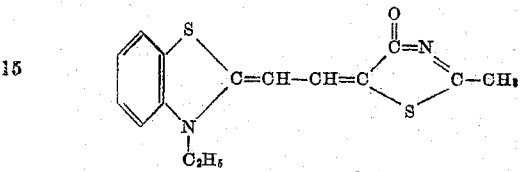

Thioacetamide (7.5 g., 10 mols.) and chloroacetamide (9.39 g., 10 mols.) were dissolved in ethyl alcohol and heated to the refluxing temperature. The mixture was allowed to stand at room temperature for one hour and then the ammonium chloride was filtered off and discarded. 2-β-acetanilido-3-ethylbenzothiazolium iodide (4.5 g., 1 mol.) and triethylamine (2.8 ml., 2 mols.) were then added to the filtrate and the mixture warmed sufficiently to dissolve the reactants. After standing two hours at room temperature, the crude dye was filtered off, washed with a little methyl alcohol and dried. After two recrystallizations from methyl alcohol and one from benzene, the yield of pure dye was 9%, M.P. 228–9° C. dec.

*Analysis.*—Calcd. for $C_{15}H_{15}N_2OS_2$: N, 9.3%. Found: N, 9.3%.

*Example 4.—7-methyl-3-(3-methyl-2(3H)-benzoxazolylidene)imidazo[1,2-a]pyridin-2(3H)-one hydroiodide*

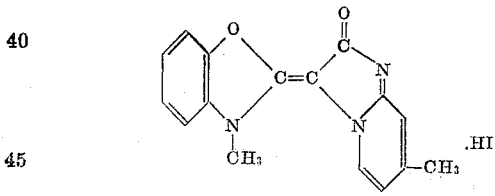

2-methylmercaptobenzoxazole (4.95 g., 1 mol. +50%) and methyl p-toluenesulfonate (5.58 g., 1 mol. +50%) were mixed and heated to reflux and were then allowed to cool slowly to room temperature. 7-methylimidazo[1,2-a]pyridin-2(3H)-one hydrochloride (3.68 g., 1 mol.), triethylamine (8.4 ml.) and ethyl alcohol (30 ml.) were added and the reaction mixture was heated to reflux and then allowed to stand overnight at room temperature. The crude product was precipitated by the addition with stirring of sodium iodide (5 g.) in water (100 ml.) and ether (100 ml.). After chilling overnight, the crude dye was filtered off, washed with water and ether and dried. After two recrystallizations from methyl alcohol, the yield of purified dye was 1.45 g. (18%), M.P. 211–13° C. dec.

*Example 5.—7-methyl-3-(3-methyl-2(3H)-benzothiazolylidene)imidazo[1,2-a]pyridin-2(3H)-one hydroiodide*

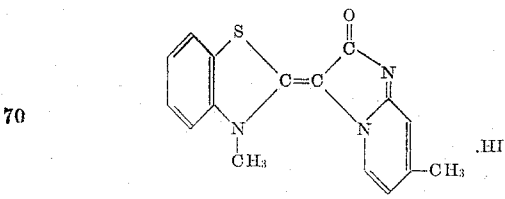

7-methylimidazo[1,2-a]pyridin-2(3H)-one hydrochloride (3.68 g., 1 mol.), 3-methyl-2-methylmercaptobenzothiazolium p-toluenesulfonate (10.01 g., 1 mol. +50%) and triethylamine (1 mol. +100%) were dissolved in ethyl alcohol (30 ml.) and the mixture heated to the reflux temperature and allowed to cool slowly to room temperature. After chilling overnight, the crude dye was filtered off, washed with methyl alcohol and dried. The crude chloride was converted to the iodide by the addition of aqueous sodium iodide to an alcoholic solution of the dye. After two recrystallizations from methyl alcohol, the yield of purified dye was 3.7 g. (57%), M.P. 192–3° C. dec.

*Example 6.—7-methyl-3-[(3-methyl-2(3H)-thiazolinylidene)ethylidene]imidazo[1,2-a]pyridin-2(3H)-one*

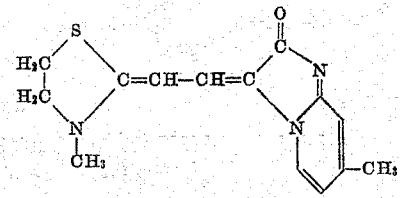

7 - methylimidazo[1,2 - a]pyridin - 2(3H) - one hydrochloride (3.68 g., 1 mol.), 2-β-acetanilidovinyl-3-methylthiazolinium iodide (7.76 g., 1 mol.) and triethylamine (5.6 ml., 1 mol. +100%) were dissolved in ethyl alcohol (30 ml.) and heated under reflux for thirty minutes. The reaction mixture was chilled, filtered and the crude dye washed with a little methyl alcohol and dried. The crude dye iodide was then dissolved in hot water (200 ml.) and the base precipitated by the addition of excess aqueous sodium carbonate. The mixture was chilled overnight and the crude dye filtered off, washed with cold water and dried. After two recrystallizations from water, the yield of purified dye was 4.7 g. (84%), M.P. 246–7° C. dec.

*Example 7.—3 - [(3 - ethyl - 2(3H)-benzoxazolylidene)-ethylidene]-7-methyl-imidazo[1,2 - a]pyridin - 2(3H)-one*

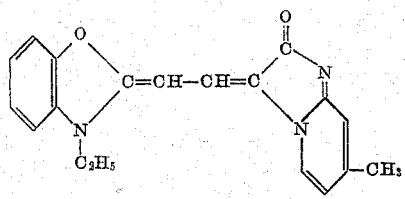

7-methylimidazo[1,2 - a]pyridin - 2(3H) - one hydrochloride (3.68 g., 1 mol.), 2-β-acetanilidovinyl-3-ethylbenzoxazolium iodide (8.68 g., 1 mol.) and triethylamine (5.6 ml., 1 mol. +100%) were dissolved in ethyl alcohol (30 ml.) and heated to the reflux temperature. The reaction mixture was allowed to cool slowly to room temperature. After standing for one hour, the crude dye iodide was filtered off, washed with a little acetone and dried. The crude salt was dissolved in water (400 ml.) and treated with an excess of aqueous sodium carbonate. After chilling, the dye base was filtered off, washed with a little water and dried. After two recrystallizations from aqueous methyl alcohol, the yield of purified dye was 4.5 g. (71%), M.P. 224–5° C.

*Example 8.—3 - [(3 - ethyl-2(3H)-benzothiazolylidene)-ethylidene]-7-methyl-imidazo[1,2 - a]pyridin - 2(3H)-one*

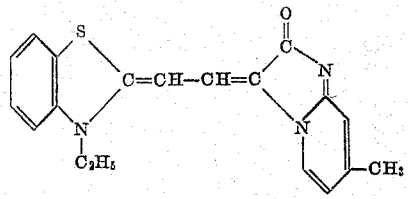

7-methylimidazo[1,2 - a]pyridin - 2(3H) - one hydrochloride (4.04 g., 1 mol. +10%), 2-β-acetanilidovinyl-3-ethylbenzothiazolium iodide (9.0 g., 1 mol.) and triethylamine (5.6 ml., 1 mol. +100%) were dissolved in ethyl alcohol (30 ml.) and heated under reflux for thirty minutes. The reaction mixture was chilled, filtered and the crude dye washed with methyl alcohol and dried. The crude hydroiodide was dissolved in hot water, filtered and the filtrate treated with an excess of sodium carbonate solution. The mixture was chilled, filtered and the crude dye washed with water and dried. After two recrystallizations from methyl alcohol, the yield of purified dye was 52%, M.P. 253–4° C. dec.

*Example 9.—7-[(3-ethyl-2(3H)-benzothiazolylidene) propenyl]-5-methyltetrazolo[a]pyrimidine*

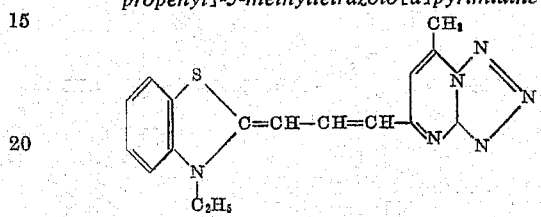

5,7-dimethyltetrazolo[a]pyrimidine (1.49 g. 1 mol.), 2-β-acetanilidovinyl-3-ethylbenzothiazolium iodide (4.50 g., 1 mol.) and triethylamine (1.5 ml., 1 mol.+10%) were dissolved in ethyl alcohol (15 ml.) and heated under reflux for thirty minutes. After chilling, the crude dye was thrown out of solution by the addition with stirring of water. The aqueous portion was decanted and the residue dissolved in acetone and again precipitated with water. The solid was filtered off and extracted with boiling benzene. The benzene solution of the dye was filtered, concentrated and chilled. The crude dye was then filtered off and dried. After two recrystallizations from ethyl alcohol, the yield of pure dye was 0.20 g. (6%), M.P. 190–91° C. dec.

*Analysis.*—Calcd. for $C_{17}H_{16}N_6S$: N, 25.0%. Found: N, 24.7%.

*Example 10.—5,7-di[(3-ethyl-2(3H)-benzothiazolylidene)propenyl]-tetrazolo[a]pyrimidine*

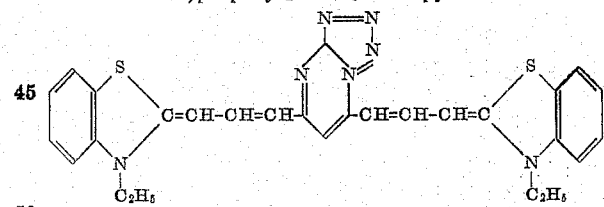

5,7-dimethyltetrazolo[a]pyrimidine (1.49 g., 1 mol.), 2-β-acetanilidovinyl-3-ethylbenzothiazolium iodide (9.0 g., 2 mols.) and triethylamine (3.1 ml., 2 mols.+10%) were dissolved in pyridine (15 ml.) and heated under reflux for twenty minutes. The reaction mixture was chilled and the crude dye was precipitated with water. The aqueous portion was decanted and the residue dissolved in pyridine and precipitated with methyl alcohol. The crude dye was filtered off, washed with methyl alcohol and dried. The crude product was twice recrystallized by dissolving in hot pyridine, filtering and precipitating with methanol. The yield of purified dye was 0.6 g. (12%), M.P. 205–6° C. dec.

*Analysis.*—Calcd. for $C_{28}H_{25}N_7S_2$: N, 18.7%. Found: N, 18.3%.

*Example 11. — 1-phenyl-5-[(1,3,3-trimethyl-2(3H)-indolylidene)ethylidene]-2-[3 - (1,3,3 - trimethyl - 2(3H)-indolylidene)propenyl]-4,6(1H,5H)-pyrimidinedione*

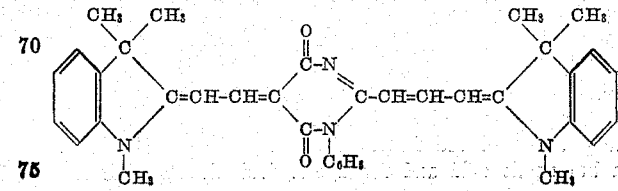

6-hydroxy-2-methyl-3-phenyl-4(3H)-pyrimidone (1 g., 1 mol.), 2-β-acetanilidovinyl-1,3,3-trimethylpseudoindolium iodide (5.7 g., 2 mols.+50%), and triethylamine (1.4 ml., 2 mols.) were dissolved in pyridine (15 ml.) and heated under reflux for ten minutes. The reaction mixture was chilled, filtered and the crude dye washed with ethyl alcohol and dried. The crude dye was twice recrystallized by dissolving in pyridine, filtering and precipitating with methyl alcohol. The yield of purified dye was 0.7 g. (25%), M.P. 275–7° C. dec.

*Example 12.* — 5-[(1-ethyl-2(1H)-quinolylidene)ethylidene]-2-[3-(1-ethyl-2(1H) - quinolylidene)propenyl]-1-phenyl-4,6(1H,5H)-pyrimidinedione hydroiodide

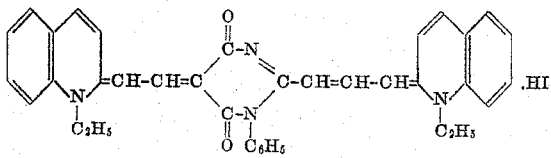

6-hydroxy-2-methyl-3-phenyl-4(3H)-pyrimidone (1 g., 1 mol.), 2-β-acetanilidovinyl-1-ethylquinolinium iodide (5.5 g., 2 mols.+50%) and triethylamine (1.4 ml., 2 mols.) were dissolved in pyridine (15 ml.) and heated under reflux for ten minutes. After cooling, the crude dye was filtered off, washed with methyl alcohol and then with water and dried. The crude dye was recrystallized by dissolving in cresol, filtering and precipitating with methyl alcohol. The yield of purified dye was 2.8 g. (80%), M.P. 244–6° C. dec.

*Example 13.* — 5-(3-ethyl-2(3H)-benzothiazolylidene)-2-(3-ethyl - 2(3H) - benzothiazolylidene)methylthiazolin-4-one

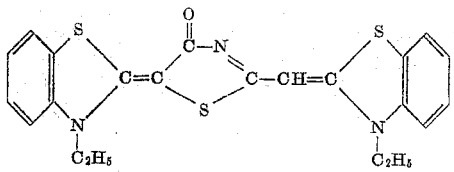

5-(3 - ethyl - 2(3H) - benzothiazolylidene) - 2 - methylthiazolin-4-one (1.05 g., 1 mol.), 3-ethyl-2-ethylmercaptobenzothiazolium ethylsulfate (2.46 g., 1 mol.+100%) and triethylamine (1.1 ml., 1 mol.+100%) were dissolved in pyridine and heated under reflux for ten minutes. The crude dye was then precipitated by the addition of water (100 ml.) and filtered. The crude dye was stirred with methyl alcohol, filtered and dried. After two recrystallizations from pyridine and methyl alcohol the yield of purified dye was 0.37 g. (22%), M.P.>320° C.

*Example 14.* — 5-(3-ethyl-2(3H)-benzothiazolylidene)-2-(3-ethyl - 2(3H) - benzothiazolylidene)propenyl - thiazolin-4-one

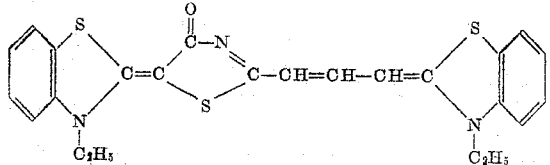

5-(3-ethyl-2-(3H) - benzothiazolylidene) - 2 - methylthiazolin-4-one (0.75 g., 1 mol.), 2-β-acetanilidovinyl-3-ethylbenzothiazolium iodide (1.22 g., 1 mol.) and triethylamine (0.74 ml., 1 mol.+100%) were dissolved in pyridine (10 ml.) and heated under reflux for ten minutes. The crude dye was precipitated by pouring into water (100 ml.) was then filtered off, washed with methyl alcohol and dried. The crude dye was dissolved in hot acetic acid and the dye hydroiodide precipitated by the addition of sodium iodide (1 g.). The dye hydroiodide was filtered off, suspended in methyl alcohol and the base liberated by the addition of excess triethylamine. The free base was then filtered off and dried. After two recrystallizations by dissolving in pyridine and precipitating with 70% aqueous methanol, the yield of pure dye was 0.42 g. (33%), M.P. 224–5° C. dec.

*Example 15.* — 5[(3 - ethyl - 2(3H) - benzothiazolylidene)ethylidene]-2-[(3-ethyl - 2(3H) - benzothiazolylidene)methyl]-2-thiazolin-4-one

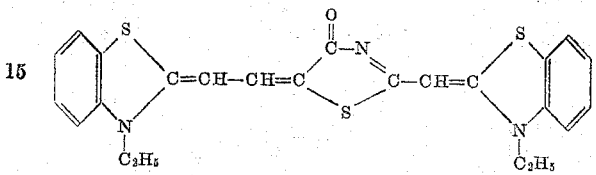

*Method A.*—5-[(3-ethyl-2(3H)-benzothiazolylidene)-ethylidene]-2-methylthiazolin-4-one (0.30 g., 1 mol.), 3-ethyl-2-ethylmercaptobenzothiazolium ethyl sulfate (0.70 g., 1 mol +100%) and triethylamine (0.28 ml., 1 mol. + 100%) were dissolved in pyridine (5 ml.) and heated under reflux for five minutes. The crude dye was precipitated by the addition of water, the aqueous portion decanted and the residue stirred with methyl alcohol until crystalline. The crude dye was filtered off, washed with methyl alcohol and dried. After two recrystallizations from pyridine and methyl alcohol, the yield of purified dye was 0.13 g. (28%). The purified dye alone and after mixture with an authentic sample prepared by method (B), melted at 306–7° C. with decomposition.

*Method B.*—5-[(3-ethyl-2(3H)-benzothiazolylidene)-ethylidene]-2-methylthio-4(5H)-thiazolone (Brooker, U.S.P. 2,177,402) (1.7 g., 1 mol.), 3-ethyl-2-methylbenzothiazolium iodide (1.5 g., 1 mol.) and triethylamine (1.4 ml., 2 mols.) were dissolved in pyridine (20 ml.) and heated under reflux for fifteen minutes. The reaction mixture was poured into water and the crude product filtered off and washed with methyl alcohol and dried. The crude dye was dissolved in pyridine, filtered and an equal volume of methyl alcohol added to the filtrate. The precipitated dye was filtered off and discarded. The filtrate was then chilled overnight and the desired dye filtered off, washed with methyl alcohol and dried. After two recrystallizations from pyridine and methyl alcohol, the yield of purified dye was 0.4 g. (17%), M.P. 306–7° C.

*Example 16.* — 2 - (3 - ethyl - 2(3H) - benzothiazolylidene)propenyl - 5 - (3 - ethyl - 2(3H) - benzothiazolylidene)ethylidene-thiazolin-4-one

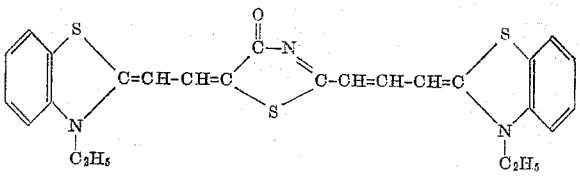

5 - [(3 - ethyl - 2(3H) - benzothiazolylidene)ethylidene]-2-methylthiazolin-4-one (0.30 g., 1 mol.), 2-β-acetanilidovinyl-3-ethylbenzothiazolium iodide (0.45 g., 1 mol.) and triethylamine (0.3 ml., 1 mol. +100%) were dissolved in pyridine (10 ml.) and heated under reflux for ten minutes. The crude dye was precipitated by the addition with stirring of water (100 ml.). After chilling overnight, the crude dye was filtered off, washed with a little methyl alcohol and dried. After two recrystallizations from pyridine and 70% aqueous methyl alcohol, the yield of pure dye was 0.23 g. (46%). The dye melted at 183–5° C. with loss of solvent of crystallization and decomposed at 250° C.

*Example 17.—3 - ethyl - 5 - (3 - ethyl - 2(3H) - benzoxazolylidene)ethylidene - 2 - [5 - (3 - ethyl - 2(3H) - benzoxazolylidene)ethylidene - 4 - oxo - 2 - thiazolinyl]methylene-4-thiazolidone*

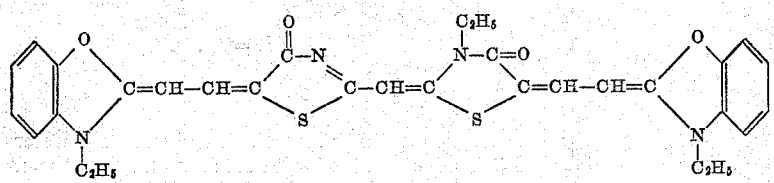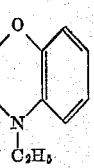

3 - ethyl - 5 - [(3 - ethyl - 2(3H) - benzoxazolylidene)ethylidene]-rhodanine (0.45 g., 1 mol.) and methyl p-toluenesulfonate (0.5 g.) were mixed and fused over a free flame and then heated on the steam bath for one hour. 5 - [(3 - ethyl - 2(3H) - benzoxazolylidene)ethylidene]-2-methylthiazolin-4-one (0.45 g., 1 mol.), triethylamine (0.2 ml.) and pyridine (10 ml.) were then added to the melt and the reaction mixture heated under reflux for ten minutes. The reaction mixture was then poured into water (100 ml.). The aqueous solution was decanted and the residue boiled with methyl alcohol (100 ml.), cooled to room temperature and filtered. The crude dye was washed with a little methyl alcohol and dried. After two recrystallizations from pyridine and methyl alcohol, the yield of pure dye was 0.27 g. (31%), M.P. 306–7° C. dec.

*Example 18.—3 - (3-methyl - 2(3H) - benzoaxazolylidene) - 7 - [(3 - methyl - 2(3H) - benzoxazolylidene)-methyl]imidazo[1,2-a]pyridin-2(3H)-one hydroiodide*

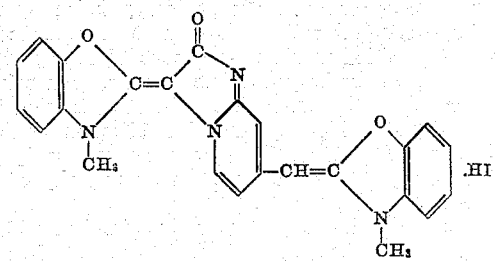

7 - methyl - 3 - (3 - methyl - 2(3H) - benzoxazolylidene)imidazo - [1,2 - a]pyridin - 2(3H) - one hydrochloride (0.41 g., 1 mol.), 3-methyl-2-methylmercaptobenzoxazolium p-toluenesulfonate (1.40 g., 1 mol. +300%) and triethylamine (0.28 ml., 1 mol. +100%) were dissolved in acetic anhydride (10 ml.) and heated under reflux for ten minutes. The reaction mixture was then poured into water (100 ml.) containing sodium iodide (5 g.). After standing for an hour, the crude dye was filtered off, washed with water and ether and dried. After two recrystallizations from methyl alcohol, the yield of purified dye was 0.23 g. (44%), M.P. 274–5° C. dec.

*Example 19.—7 - [(3 - ethyl - 2(3H) - benzothiazolylidene)propenyl] - 3 - (3 - methyl - 2(3H) - benzothiazolylidene)imidazo[1,2 - a]pyridin - 2(3H) - one hydroiodide*

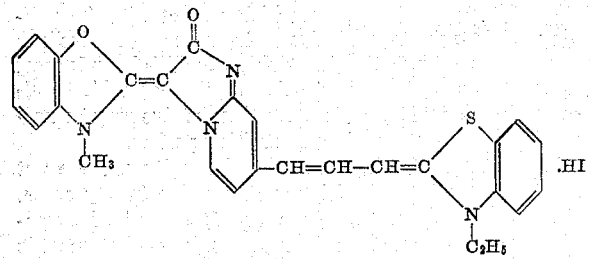

7 - methyl - 3 - (3 - methyl - 2(3H) - benzothiazolylidene)imidazo - [1,2 - a]pyridin - 2(3H) - one hydroiodide (0.84 g., 1 mol.), 2-β-acetanilidovinyl-3-ethylbenzothiazolium iodide (0.90 g., 1 mol.) and triethylamine (1.12 g., 1 mol. +100%) were dissolved in acetic anhydride and heated under reflux for fifteen minutes. The crude dye separated from the hot reaction mixture and was filtered off, washed with methyl alcohol and dried. After two recrystallizations from methyl alcohol, the yield of purified dye was 0.43 g. (35%), M.P. 228–9° C. dec.

*Example 20.—7 - [(3 - methyl - 2(3H) - benzothiazolylidene)methyl] - 3 - [(3 - methyl - 2(3H) - thiazolinylidene)ethylidene]imidazo - [1,2 - a]pyridin - 2(3H) - one hydroiodide*

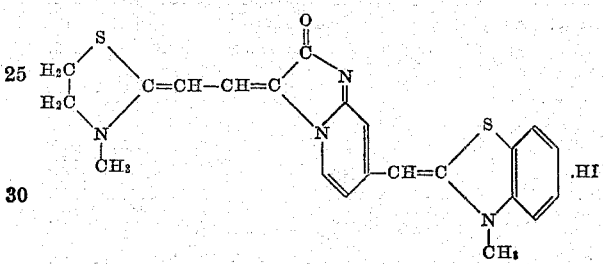

7 - methyl - 3 - [(3 - methyl - 2(3H) - thiazolinylidene) ethylidene] - imidazo[1,2 - a]pyridin - 2(3H) - one (0.91 g., 1 mol.), 3-methyl-2-methylmercaptobenzothiazolium p-toluenesulfonate (2.44 g., 1 mol. +100%) and triethylamine (1 ml., 1 mol. +100%) were dissolved in acetic anhydride (20 ml.) and heated under reflux for fifteen minutes. The reaction mixture was then chilled, 2 g. sodium iodide in 10 ml. water added, and the crude product was filtered off, washed with methyl alcohol and dried. After two recrystallizations from methyl alcohol, the yield of purified dye was 0.61 g. (34%), M.P. 296–7° C. dec.

*Example 21.—3 - [(3 - ethyl - 2(3H) - benzoxazolylidene)ethylidene] - 7 - [(3 - ethyl - 2(3H) - benzoxazolylidene)propenyl]imidazo[1,2 - a] - pyridin - 2(3H)-one hydroiodide*

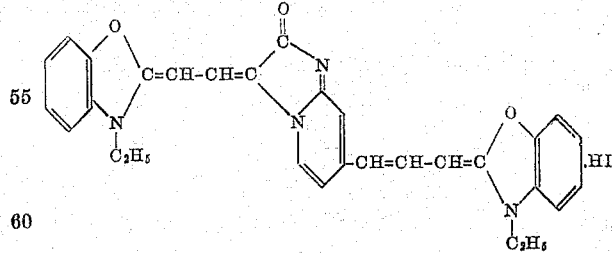

3 - [(3-ethyl-2(3H)-benzoxazolylidene)ethylidene]-7-methyl-imidazo[1,2-a]pyridin-2(3H)-one (1.06 g., 1 mol.). 2-β-acetanilidovinyl-3-ethylbenzoxazolium iodide (1.45 g., 1 mol.) and triethylamine (1 ml., 1 mol.+100%) were dissolved in acetic anhydride and heated under reflux for fifteen minutes. The reaction mixture was chilled overnight and the crude dye filtered off, washed with methyl alcohol and dried. The crude dye was twice recrystallized by suspending in methyl alcohol, adding an excess of triethylamine, filtering and precipitating the dye from the filtrate by acidification with acetic acid. The yield of purified dye after two such treatments was 0.25 g. (12%), M.P. 240–241° C. dec.

*Example 22.— 3-[(3-ethyl-2(3H)-benzothiazolylidene)ethylidene]-7-[(3-methyl-2(3H)-benzothiazolylidene)-methyl]imidazo[1,2-a]pyridin-2(3H)-one*

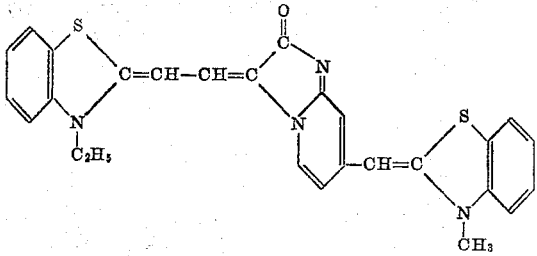

3 - [(3-ethyl-2(3H)-benzothiazolylidene)ethylidene]-7-methyl-imidazo[1,2-a]pyridin-2-(3H)-one (1.15 g., 1 mol.), 3 - methyl-2-methylmercaptobenzothiazolium p-toluenesulfonate (3.67 g., 1 mol.+300%) and triethylamine (1.4 ml., 1 mol.+300%) were dissolved in acetic anhydride (20 ml.) and heated under reflux for fifteen minutes. The reaction mixture was chilled and the crude dye filtered off, washed with methyl alcohol and dried. The crude dye was suspended in boiling methyl alcohol (600 ml.), and triethylamine (2 ml.) was added. The solution was filtered and the filtrate concentrated to 200 ml. and chilled. The crude dye base was then filtered off and dried. The crude dye base was purified by dissolving in methyl alcohol containing a little acetic acid, filtering and precipitating the base from the filtrate by the addition of excess triethylamine. After two such treatments, the yield of pure dye base was 0.88 g. (73%), M.P. 285–7° C. dec. with softening at 250° C.

The following examples will serve to illustrate the method of preparing certain of the intermediates represented by Formulas III, VIII and Xa above.

*Example 23.—5,7-dimethyltetrazolo[a]pyrimidine*

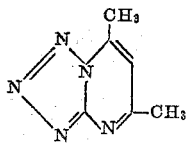

5-aminotetrazole (21 g., 1 mol.), 2,4-pentanedione (25 g., 1 mol.) and piperidine (5 ml.) were dissolved in ethyl alcohol (150 ml.) and heated under reflux for sixteen hours. The reaction mixture was then concentrated to dryness and the product extracted with hot ligroin (90–120° C.). The product crystallized from the chilled ligroin solution and was filtered off and dried. The yield of recrystallized product was 15 g. (40%), M.P. 148–150° C.

*Example 24.—6-hydroxy-2-methyl-3-phenyl-4(3H) pyrimidone*

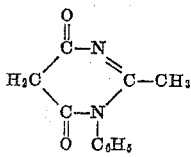

Sodium (13.8 g., 3 mols.) was dissolved in ethyl alcohol (200 ml.) and the solution of sodium ethoxide was then cooled in an ice bath. N-phenylacetamidine hydrochloride (39.5 g.) was then dissolved in ethyl alcohol (125 ml.) and added to the sodium ethylate solution. After ten minutes, the precipitated sodium chloride was filtered off and ethyl malonate (32 g., 2 mols.) was added to the filtrate. The reaction mixture was then heated under reflux for six days. The solid product was then filtered off, dissolved in water and precipitated by acidification with acetic acid. The product (64%) was filtered off, washed with water and dried. After purification by dissolving in ethyl alcohol as the triethylamine salt and precipitating with acetic acid, the yield was 38%, M.P. 173–176° C.

*Example 25.—7-methylimidazo[1,2-a]pyridin-2(3H)-one hydrochloride*

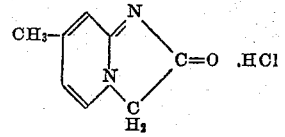

Chloroacetic acid (87 g., 1 mol.) was dissolved in water (900 ml.) and neutralized with solid sodium carbonate. 2-amino-4-methylpyridine was added to the aqueous solution and the mixture heated on the steam bath for four hours. The mixture was then acidified with concentrated hydrochloric acid (150 ml.) and evaporated to dryness on the steam bath. The residue was then recrystallized from methyl alcohol and the yield was 78.2 g. (47%), M.P. 298–9° C.

In a similar manner, other intermediates can be prepared by replacing the N-phenylacetamidine hydrochloride of Example 23 by other corresponding aryl compounds.

All of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine (or warm methanol) has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver-chlorobromide, gelatino-silver-bromide, and gelatino-silver-bromiodide developing-out emulsions.

Figure 2:
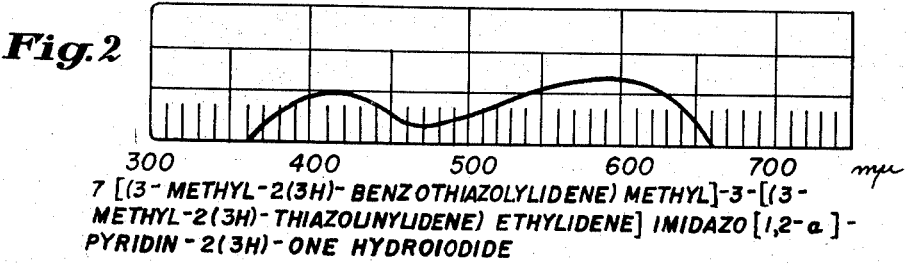
Figure 3:
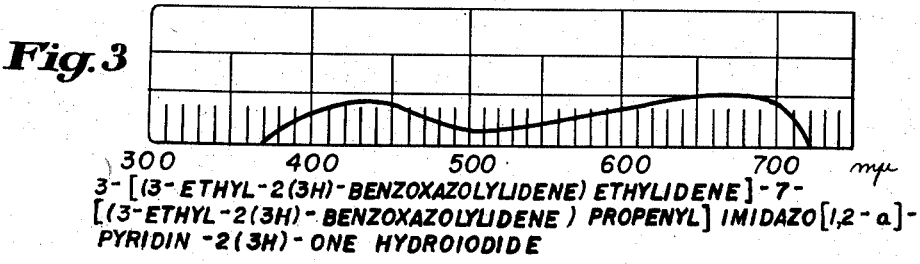

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085, 2,597,856 and 2,597,915), various palladium compounds, such as palladium chloride (U.S. 2,540,086), potassium chloropalladate (U.S. 2,598,079), etc., or mixtures of such sensitizers; anti-foggants, such as ammonium chloroplatinate (U.S. 2,566,245), ammonium chloroplatinite (U.S. 2,566,263), benzotriazole, nitrobenzimidazole, 5-nitro-indazole, benzidine, mercaptans, etc. (see Mees: "The Theory of the Photographic Process," MacMillan Pub., page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, (3 - ethyl - 2(3H) - benzothiazolylidene)methylthiazolin-4-one. The method of making this dye is shown in Example 13 above. In Fig. 2, the curve depicts the sensitivity of an ordinary gelatino-silver-chlorobromide emulsion sensitized with 7-[(3-methyl-2(3H)-benzothiazolylidene)methyl] - 3 - [(3 - methyl - 2(3H) - thiazolinylidene) - ethylidene]imidazo[1,2 - a] - pyridin - 2(3H)-one hydroiodide. The method of making this dye is shown in Example 20 above. In Fig. 3, the curve depicts the sensitivity of an ordinary gelatino-silver-bromiodide emulsion sensitized with 3-[(3-ethyl-2(3H)-benzoxazolylidene)ethylidene] - 7 - [(3-ethyl-2(3H) - benzoxazolylidene)propenyl]imidazo[1,2 - a] - pyridin - 2(3H) - one hydroiodide. The method of making this dye is shown in Example 21 above.

Certain of the dyes of our invention form addition salts with inorganic acids, such as hydrogen iodide, hydrochloric acid, phosphoric acid, etc. It is to be understood that our invention contemplates not only these dyes in the form identified by the above general formulas, but in the form of such acid addition salts as well. Examples of such acid addition salts are shown in Examples 4, 5, 12, 18, etc., above.

What we claim as our invention and desire secured by Letters Patent of the United States is:

1. A photographic silver halide emulsion sensitized with an undissociated cyanine dye selected from the class consisting of (1) those represented by the following general formula:

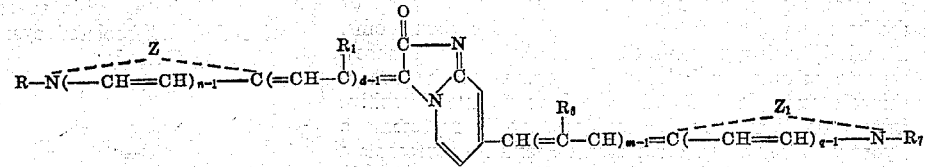

etc.; or mixtures of such addenda. Dispersing agents for color couplers, such as those set forth in U.S. Patents 2,322,027 and 2,304,940, can also be employed in the above-described emulsions.

In the manner described above, a number of the dyes of our invention were separately incorporated in an ordinary gelatino-silver-halide emulsion, the dyes being thoroughly incorporated in the emulsions by stirring. After a short digestion, the emulsions were coated onto ordinary cellulose acetate film supports and the coatings exposed in a spectrograph and sensitometer, and then developed in the usual way. The type of emulsion, sensitizing range, and maximum absorption for each of the dyes are indicated in the following table.

| Dye of Example | Emulsion | Sensitizing Range in mu | Maximum in mu |
|---|---|---|---|
| 2 | Bromo-iodide | to 550 | 525 |
| 3 | do | 580 | 555 |
| 6 | do | 535 | 490 |
| 7 | do | 585 | 535 |
| 8 | do | 595 | 565 |
| 11 | do | 580–660 | |
| 12 | do | 600–680 | 650 |
| 13 | do | 585 | 535 |
| 14 | do | 490–710 | 550+665 |
| 15 | do | 660 | 620 |
| 16 | do | 670–760 | |
| 17 | do | 720 | 525+685 |
| 18 | do | 535 | 490 |
| 19 | do | 680 | 620 |
| 20 | do | 665 | 610 |
| 21 | do | 510–720 | 670 |
| 22 | do | 510–705 | 570+665 |

The accompanying drawing further illustrates our invention. Each figure is a diagrammatic reproduction of a spectrogram showing the sensitivity of an ordinary gelatino-silver-halide emulsion containing one of our new sensitizing dyes. In Fig. 1, the curve depicts the sensitivity of an ordinary gelatino-silver-bromiodide emulsion sensitized with 5-(3-ethyl-2(3H)-benzothiazolylidene)-2- wherein R and $R_7$ each represents an alkyl group, $R_1$ and $R_6$ each represents a member selected from the group consisting of a hydrogen atom, an alkyl group and an aryl group, Z and $Z_1$ each represents the non-metallic atoms necessary to complete a heterocyclic nucleus selected from the class consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 2-pyridine series, those of the 4-pyridine series, and those of the 3,3-dialkylindolenine series, $n$ and $q$ each represents a positive integer of from 1 to 2, and $d$ and $m$ each represents a positive integer of from 1 to 3, provided that when $d$ represents 3, $R_1$ represents a hydrogen atom and when $m$ represents 3, $R_6$ represents a hyrogen atom, and (2) acid-addition salts of said undissociated cyanine dyes.

2. A photographic silver halide emulsion sensitized with an undissociated cyanine dye selected from the class consisting of (1) those represented by the following general formula:

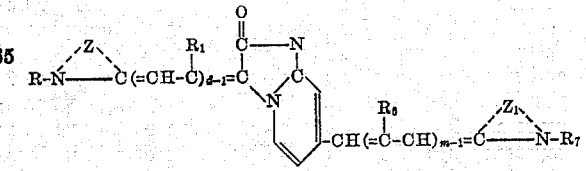

wherein R and $R_7$ each represents an alkyl group containing from 1 to 4 carbon atoms, $R_1$ and $R_6$ each represents a member selected from the class consisting of a hydrogen atom, an alkyl group containing from 1 to 3 carbon atoms, and a mononuclear aromatic group of the benzene series containing from 6 to 7 carbon atoms, Z and $Z_1$ each represents the non-metallic atoms necessary to complete a heterocyclic nucleus of the benzoxazole series, and $d$ and $m$ each represents a positive integer of from 1 to 3, provided that $R_1$ represents a hydrogen atom when $d$ represents 3 and $R_6$ represents a hydrogen atom when $m$ represents 3, and (2) acid-addition salts of said undissociated cyanine dyes.

3. A photographic silver halide emulsion, as defined in claim 2, wherein said silver halide emulsion is a photographic gelatino-silver-bromioidide developing-out emulsion.

4. A photographic silver halide emulsion sensitized with an undissociated cyanine dye selected from the class consisting of (1) those represented by the following general formula:

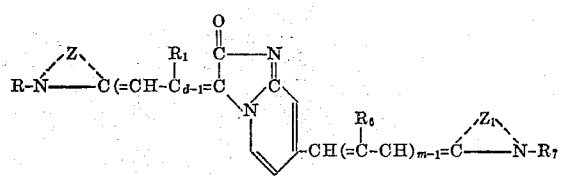

wherein R and $R_7$ each represents an alkyl group containing from 1 to 4 carbon atoms, $R_1$ and $R_6$ each represents a member selected from the class consisting of a hydrogen atom, an alkyl group containing from 1 to 3 carbon atoms, and a mononuclear aromatic group of the benzene series containing from 6 to 7 carbon atoms, Z and $Z_1$ each represents the non-metallic atoms necessary to complete a heterocyclic nucleus of the benzothiazole series, and $d$ and $m$ each represents a positive integer of from 1 to 3, provided that $R_1$ represents a hydrogen atom when $d$ represents 3 and $R_6$ represents a hydrogen atom when $m$ represents 3, and (2) acid-addition salts of said undissociated cyanine dyes.

5. A photographic silver halide emulsion, as defined in claim 4, wherein said photographic silver halide emulsion is a photographic gelatino-silver-bromioidide developing-out emulsion.

6. A photographic silver halide emulsion sensitized with an undissociated cyanine dye selected from the class consisting of (1) those represented by the following general formula:

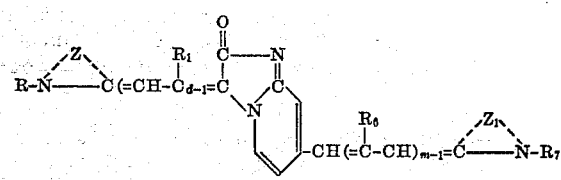

wherein R and $R_7$ each represents an alkyl group containing from 1 to 4 carbon atoms, $R_1$ and $R_6$ each represents a member selected from the class consisting of a hydrogen atom, an alkyl group containing from 1 to 3 carbon atoms, and a mononuclear aromatic group of the benzene series containing from 6 to 7 carbon atoms, Z represents the non-metallic atoms necessary to complete a heterocyclic nucleus of the thiazoline series, $Z_1$ represents the non-metallic atoms necessary to complete a heterocyclic nucleus of the benzothiazole series, and $d$ and $m$ each represents a positive integer of from 1 to 3, provided that $R_1$ represents a hydrogen atom when $d$ represents 3 and $R_6$ represents a hydrogen atom when $m$ represents 3, and (2) acid-addition salts of said undissociated cyanine dyes.

7. A photographic silver halide emulsion, as defined in claim 6, wherein said silver halide emulsion is a photographic gelatino-silver-bromioidide developing out emulsion.

8. A photographic silver halide emulsion sensitized with the undissociated cyanine dye represented by the following formula:

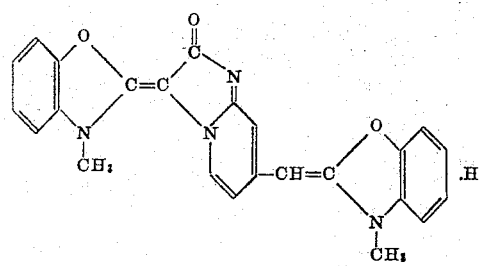

9. A photographic silver halide emulsion sensitized with the undissociated cyanine dye represented by the following formula:

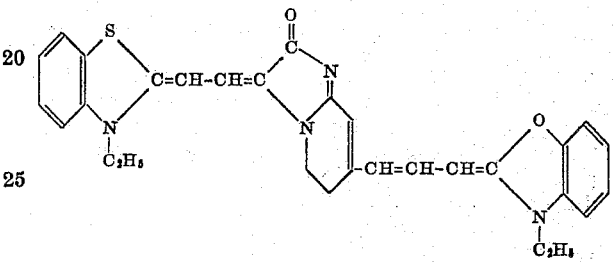

10. A photographic silver halide emulsion sensitized with the undissociated cyanine dye represented by the following formula:

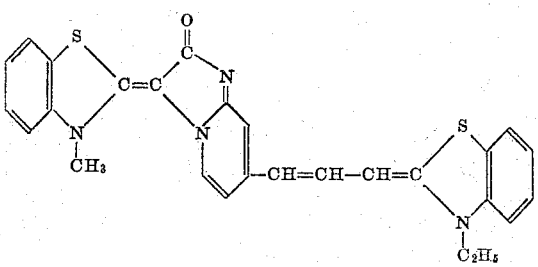

11. A photographic silver halide emulsion sensitized with the undissociated cyanine dye represented by the following formula:

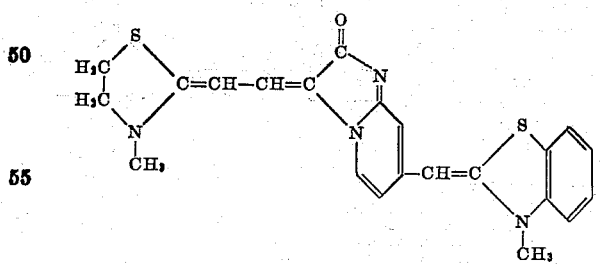

12. A photographic silver halide emulsion sensitized with the undissociated cyanine dye represented by the following formula:

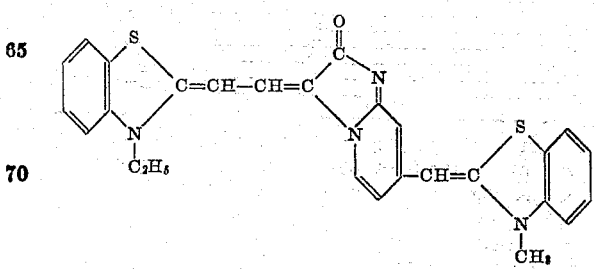

(References on following page)

References Cited in the file of this patent

UNITED STATES PATENTS

| | | |
|---|---|---|
| 2,191,810 | Stevens | Feb. 27, 1940 |
| 2,395,879 | Kendall et al. | Mar. 5, 1946 |
| 2,471,996 | Anish | May 31, 1949 |
| 2,514,649 | Knott | July 11, 1950 |
| 2,691,581 | Knott | Oct. 12, 1954 |

OTHER REFERENCES

Chemical Abstracts, 163, 101 (abstr. of Brid. Med. Jour. 1922, I, 514–5).

Chemical Abstracts, 19, 530 (abstract of Proc. Roy. Soc., London, 96B, 317–33, 1924).

UNITED STATES PATENT OFFICE
Certificate of Correction

Patent No. 2,927,026

March 1, 1960

Donald W. Heseltine et al.

It is hereby certified that error appears in the printed specification of the above numbered patent requiring correction and that the said Letters Patent should read as corrected below.

Column 18, lines 63 to 69, claim 2, for that portion of the formula reading

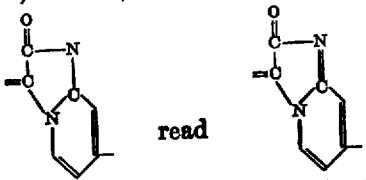 read column 19, lines 48 to 50, claim 6, for that portion of the formula reading

Signed and sealed this 23rd day of August 1960.

[SEAL]

Attest:
KARL H. AXLINE,
*Attesting Officer.*

ROBERT C. WATSON,
*Commissioner of Patents.*